(12) United States Patent
Dudzinsky

(10) Patent No.: US 8,573,912 B2
(45) Date of Patent: Nov. 5, 2013

(54) FASTENER FOR ATTACHING A MILLING CUTTER BODY TO AN ADAPTOR AND METHOD OF INSTALLING SAME

(75) Inventor: Ronald Louis Dudzinsky, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 240 days.

(21) Appl. No.: 13/020,445

(22) Filed: Feb. 3, 2011

(65) Prior Publication Data

US 2012/0201629 A1    Aug. 9, 2012

(51) Int. Cl.
*B23C 1/00* (2006.01)
*F16B 41/00* (2006.01)

(52) U.S. Cl.
USPC .............................. 411/107; 411/999; 409/234

(58) Field of Classification Search
USPC ............................ 411/999, 353, 107; 409/234
See application file for complete search history.

(56) References Cited

U.S. PATENT DOCUMENTS

| | | | |
|---|---|---|---|
| 2,040,263 A | | 5/1936 | Layne et al. |
| 2,374,919 A | * | 5/1945 | Bruseth .......................... 409/233 |
| 2,912,904 A | | 11/1959 | Peterson |
| 3,556,570 A | * | 1/1971 | Cosenza ........................ 411/176 |
| 3,878,042 A | * | 4/1975 | Curulla et al. ................. 376/446 |
| 4,325,664 A | * | 4/1982 | Mori .............................. 409/234 |
| 4,945,793 A | * | 8/1990 | von Haas ......................... 82/161 |
| 5,026,224 A | | 6/1991 | Andersson et al. |
| 5,700,115 A | | 12/1997 | Chikamori et al. |
| 6,099,483 A | | 8/2000 | Palmer et al. |
| 6,942,437 B2 | * | 9/2005 | Ripley et al. .................. 409/234 |
| 7,112,021 B2 | * | 9/2006 | Pantzar .......................... 409/234 |
| 7,775,751 B2 | * | 8/2010 | Hecht et al. ..................... 408/57 |
| 7,784,857 B2 | | 8/2010 | Naik et al. |
| 8,192,116 B2 | * | 6/2012 | Sturm ............................. 409/234 |

* cited by examiner

*Primary Examiner* — Flemming Saether
(74) *Attorney, Agent, or Firm* — Larry R. Meenan, Esq.

(57) ABSTRACT

A fastener for attaching a milling cutter body to an adaptor includes a head portion, a body portion and an undercut disposed between the head portion and the body portion. The head portion has a diameter greater than a diameter of the undercut and a thread root diameter. The diameter of the undercut is equal to or less than the thread root diameter to allow the fastener to freely rotate when the fastener is threaded completely through the milling cutter body. Once threaded completely threaded the milling cutter body, the fastener is threaded into the adaptor to securely attached the milling cutter body to the adaptor.

4 Claims, 8 Drawing Sheets

FASTENER FOR ATTACHING A MILLING CUTTER BODY TO AN ADAPTOR AND METHOD OF INSTALLING SAME

BACKGROUND OF THE INVENTION

Typically, a standard shell mill style milling cutter is fastened to an adaptor by a commercially available socket head cap screw, as shown in FIG. 6.

There are occasions in product development where design constraints of the milling cutter prohibit the use of a conventional fastener. As shown in FIG. 7, one example would be a small diameter milling cutter with a large cutting insert and the counter bore required in the milling cutter for the head 39 of the fastener would invade the pocket and the chip gash areas 38 and produce a weak cutter design.

The existing practice that is used to address this problem is to use a special fastener that consists of threads on both ends. These threads are different diameters and pitch. The milling cutter also requires a threaded portion in the bore, as shown in FIG. 8. This type of attachment requires special (time consuming) instructions to be supplied to the user. These instructions have a margin for user error, which can result in tool failure.

SUMMARY OF THE INVENTION

The problem of fastening a milling cutter to an adaptor is solved by providing a fastener with a relatively smaller head diameter than a commercially available fastener, but is larger than a thread root diameter of the fastener, and an undercut that is equal to or less than the thread root diameter of the fastener.

In one aspect, a fastener for attaching a milling cutter body to an adaptor comprises a head portion having a diameter; a body portion including threads having a thread root diameter; and an undercut disposed between the head and the body portion, the undercut having a diameter equal to or less than the thread root diameter, wherein the undercut allows the fastener to freely rotate when the fastener is threaded completely through the milling cutter body.

In another aspect, a method for attaching a milling cutter body to an adaptor using a fastener comprises:

threading the fastener completely through the milling cutter body until a head portion of the fastener contacts a seating surface in a counter bore of the milling cutter body; and threading the fastener into the adaptor to securely attach the milling cutter body to the adaptor.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Below are illustrations and explanations for a version of a fastener for attaching a milling cutter to an adaptor. However, it is noted that the fastener may be configured to suit the specific application and is not limited only to the example in the illustrations.

Figure 1:
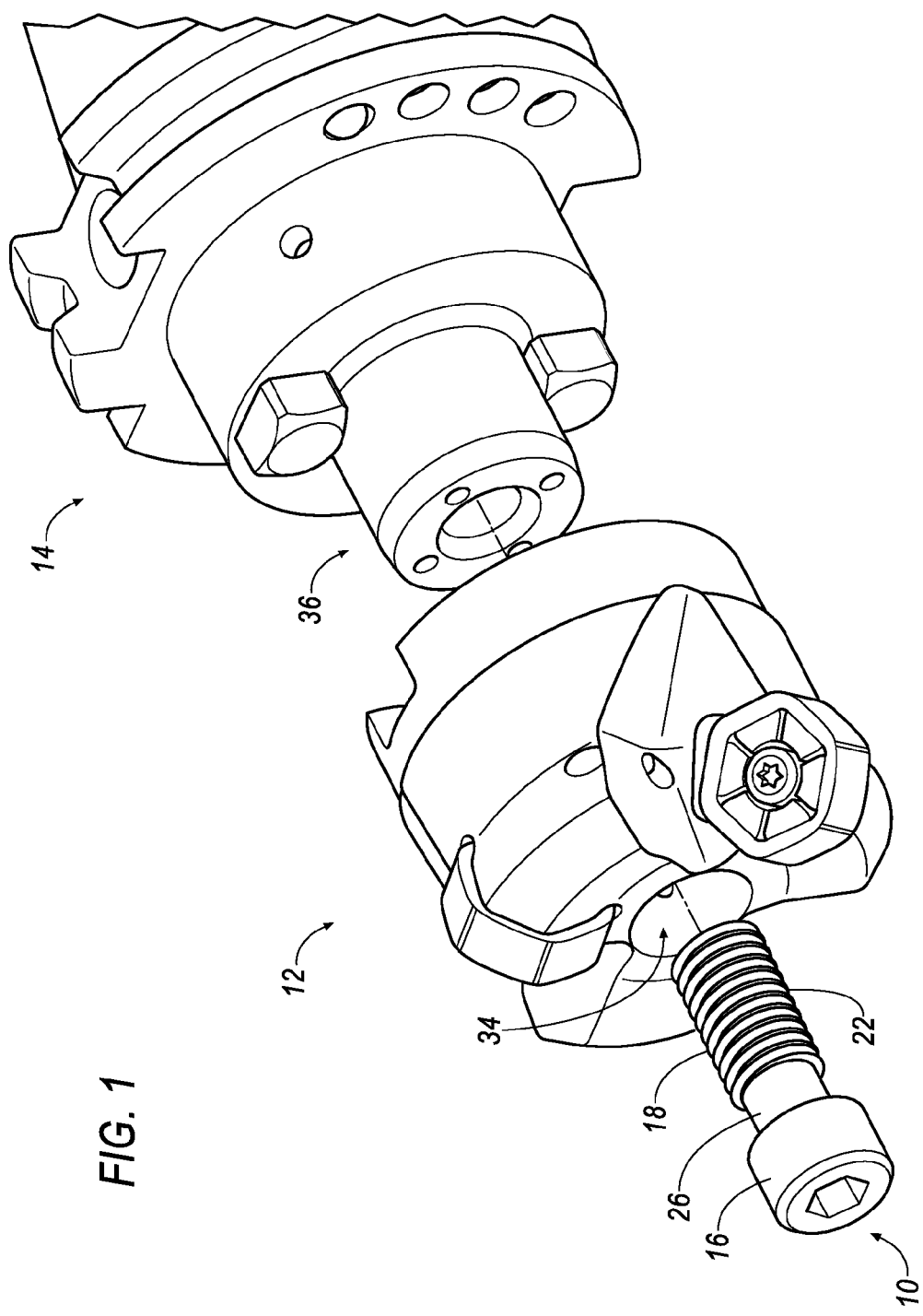
FIG. 1 is a partial perspective view of a fastener for attaching a milling cutter to an adaptor according to an exemplary embodiment of the invention.
Figure 2:
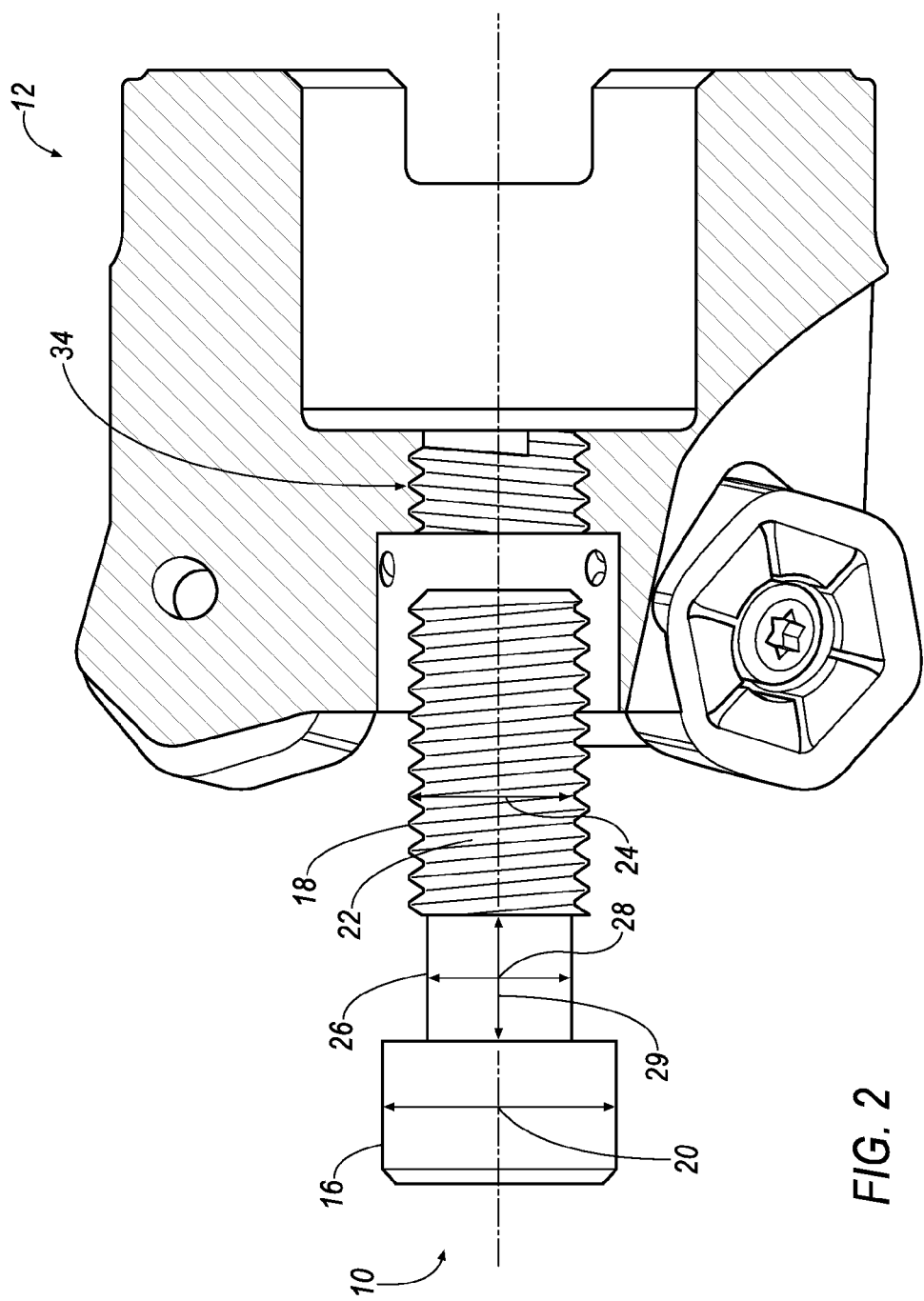
FIG. 2 is a side view of the fastener of FIG. 1 being threaded into the milling cutter body.

Referring to FIGS. 1 and 2, wherein like reference characters represent like elements, a fastener 10 for attaching a milling cutter body 12 to an adaptor 14 is shown according to an embodiment of the invention. The fastener 10 includes a head portion 16 and a body portion 18. The head portion 16 has a diameter 20 and the body portion 18 includes threads 22 with a thread root diameter 24. An undercut 26 is disposed between the head and the body portion 18. The undercut 26 has a diameter 28 that is equal to or less than the thread root diameter 24, and a width 29 sufficiently large to allow the fastener 10 to freely rotate once the fastener 10 is threaded completely through the milling cutter body 12. The diameter 20 of the head portion 16 is greater than the thread root diameter 24, and therefore, greater than the diameter 28 of the undercut 26. One aspect of the invention is that the diameter 20 of the head portion 16 is smaller than the head diameter of the conventional fastener with the same thread root diameter 24. As a result of this relatively smaller head diameter, the fastener 10 of the invention requires a smaller counter bore diameter in the milling cutter body, resulting in an stronger cutter design as compared to the cutter design with the conventional fastener.

Figure 3:
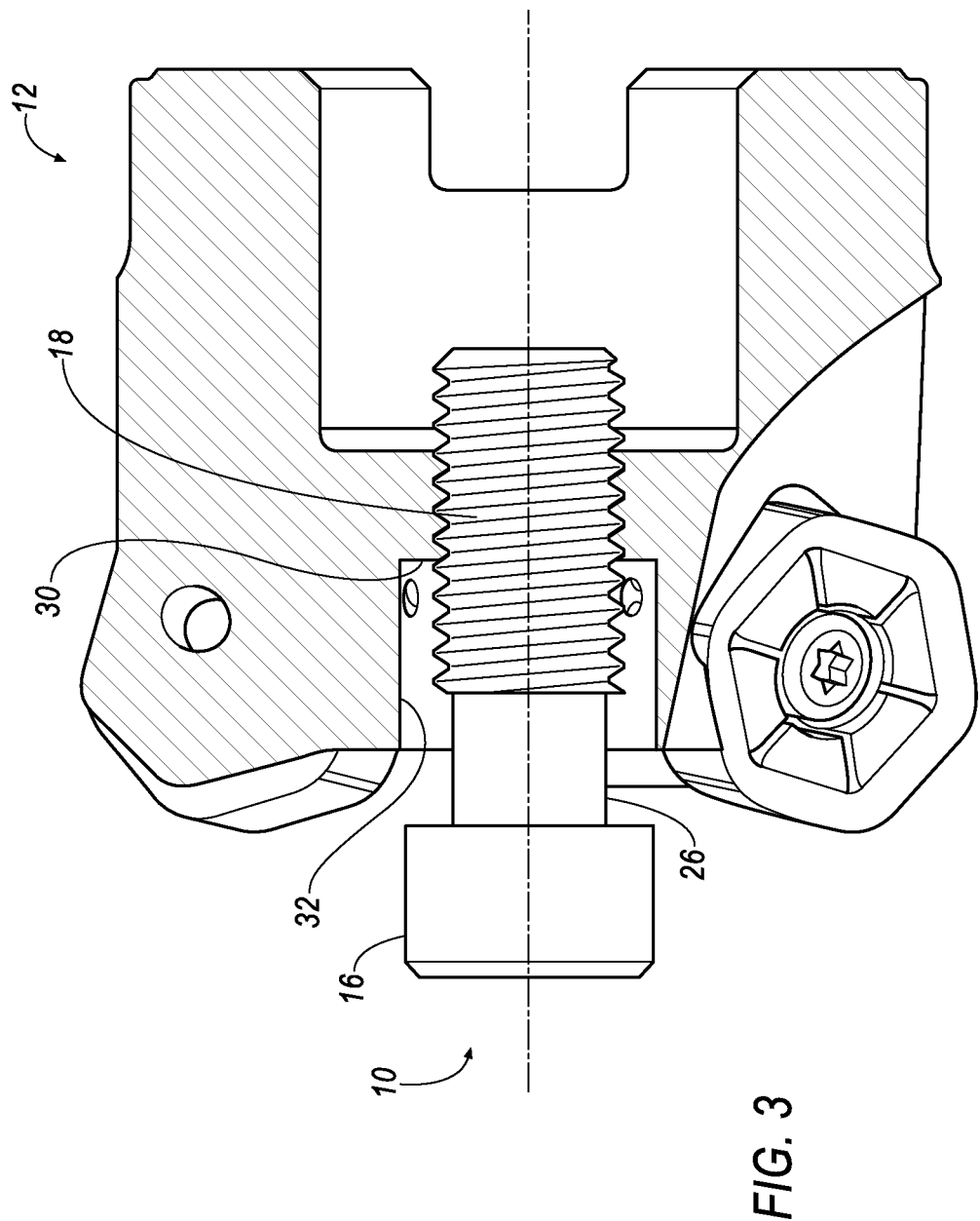
FIGS. 3-5 are side views of a method of installing the milling cutter to the adaptor using the fastener of FIG. 1.
Figure 4:
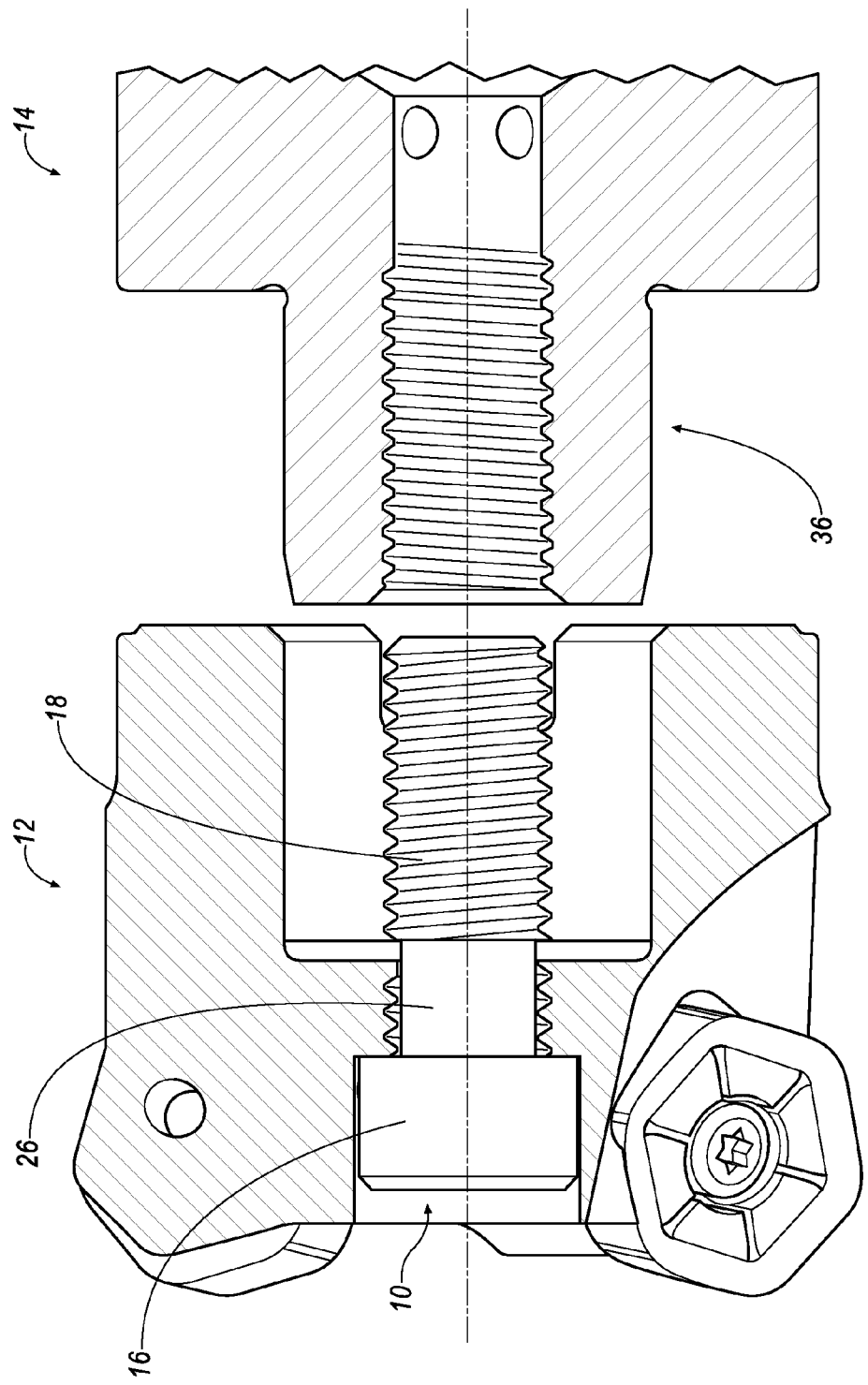
Figure 5:
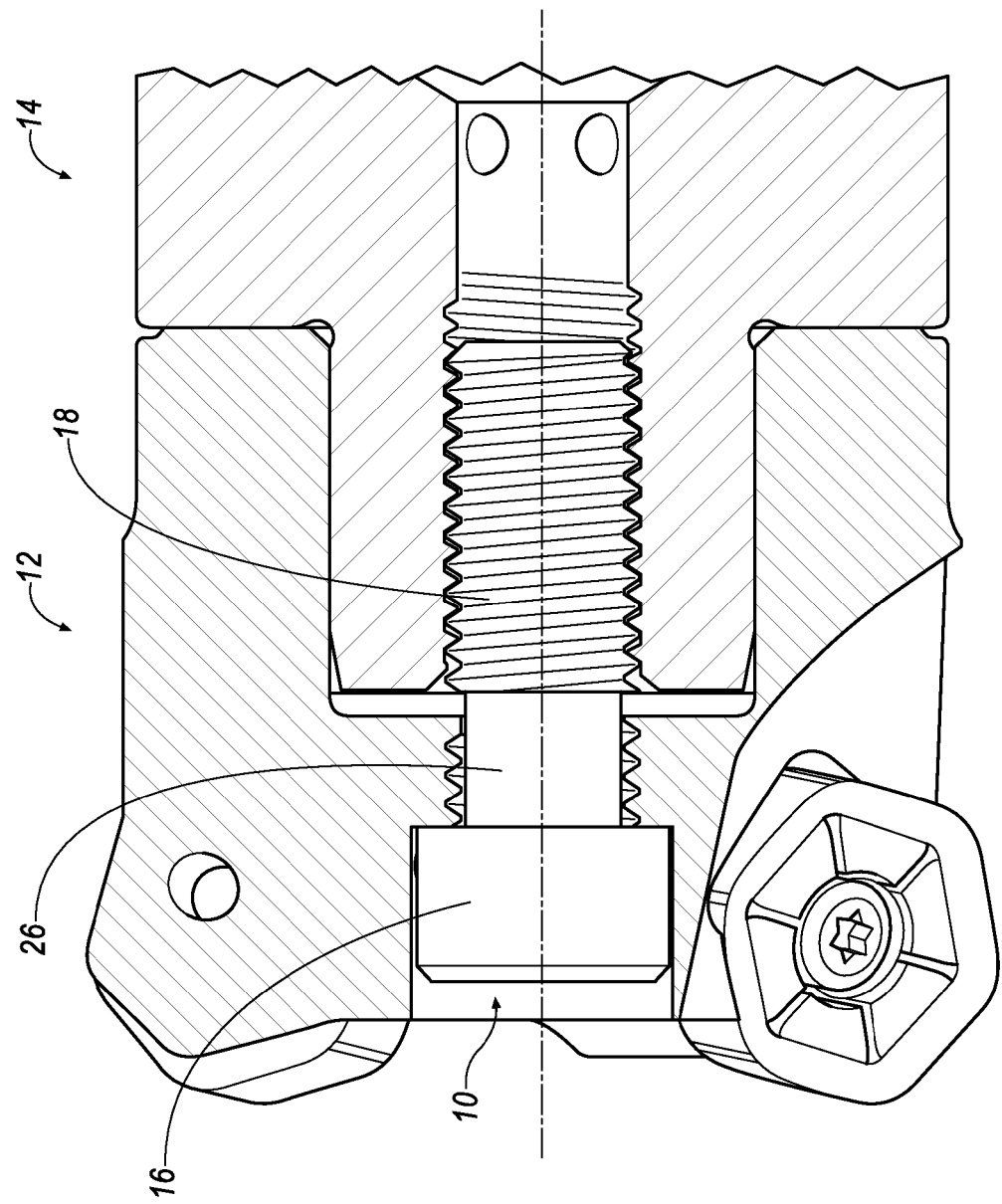
Figure 6:
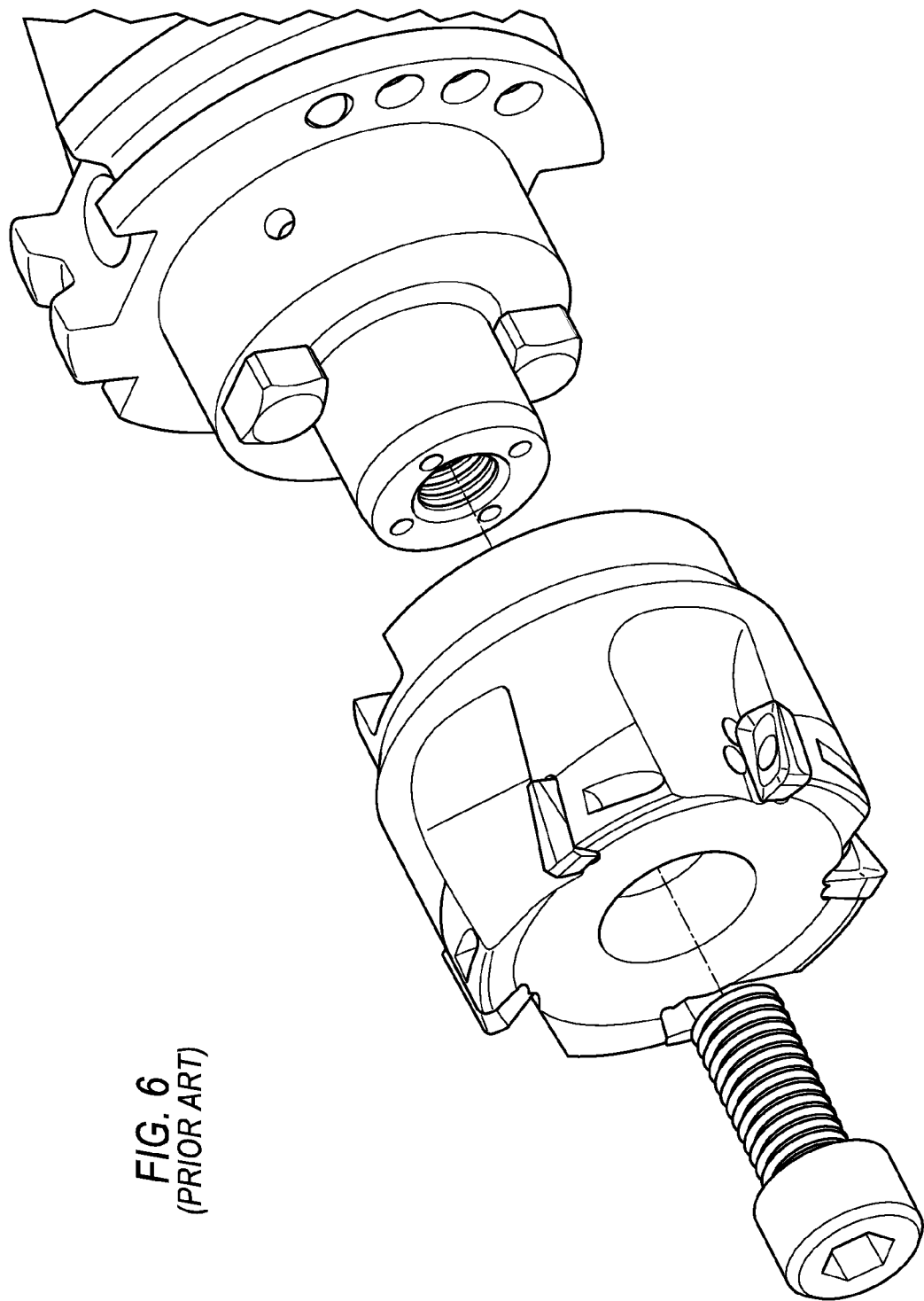
FIG. 6 is partial perspective view of a conventional fastener for attaching a milling cutter to an adaptor.
Figure 7:
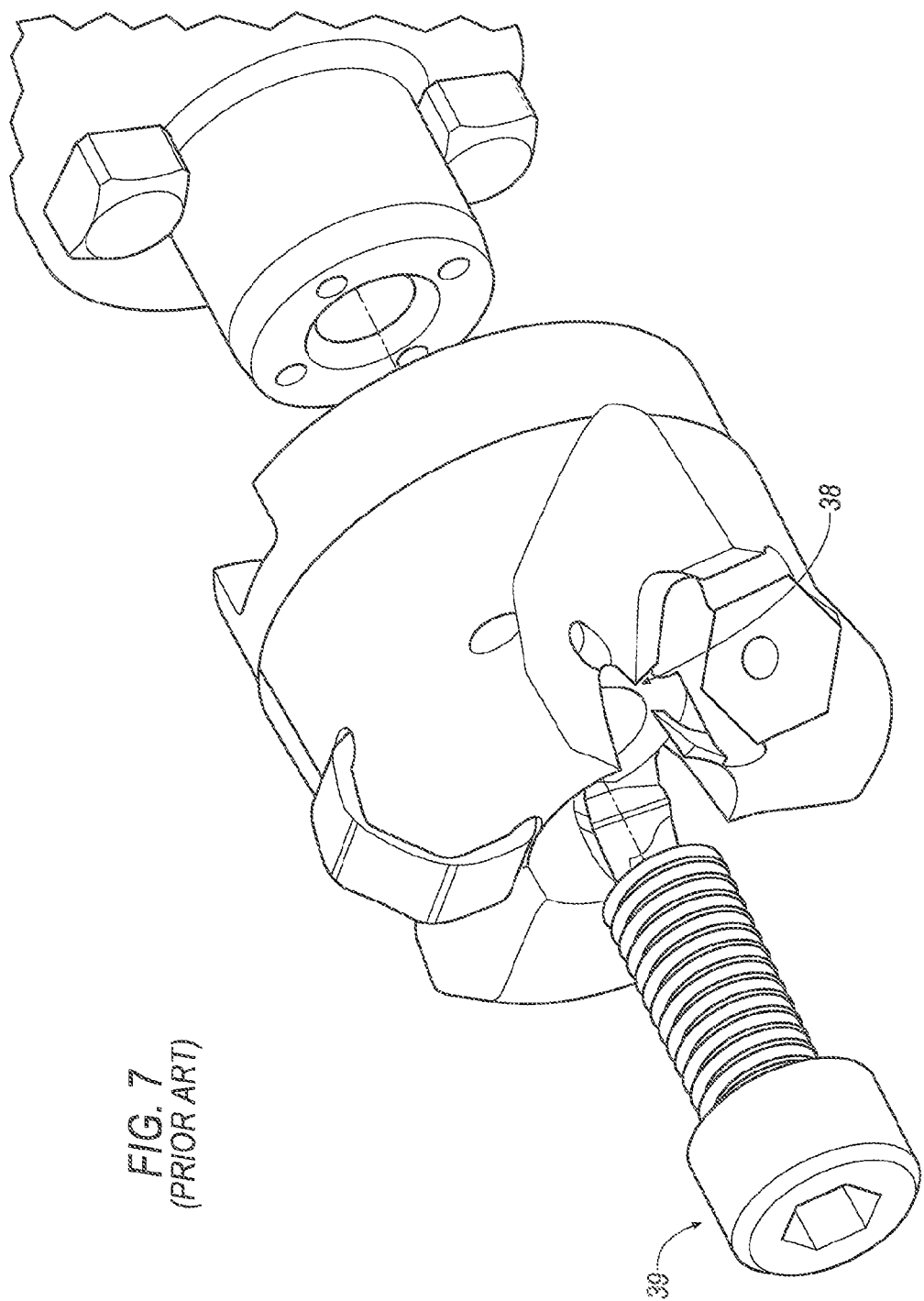
FIG. 7 is a partial perspective view of another conventional fastener for attaching a milling cutter to an adaptor.
Figure 8:
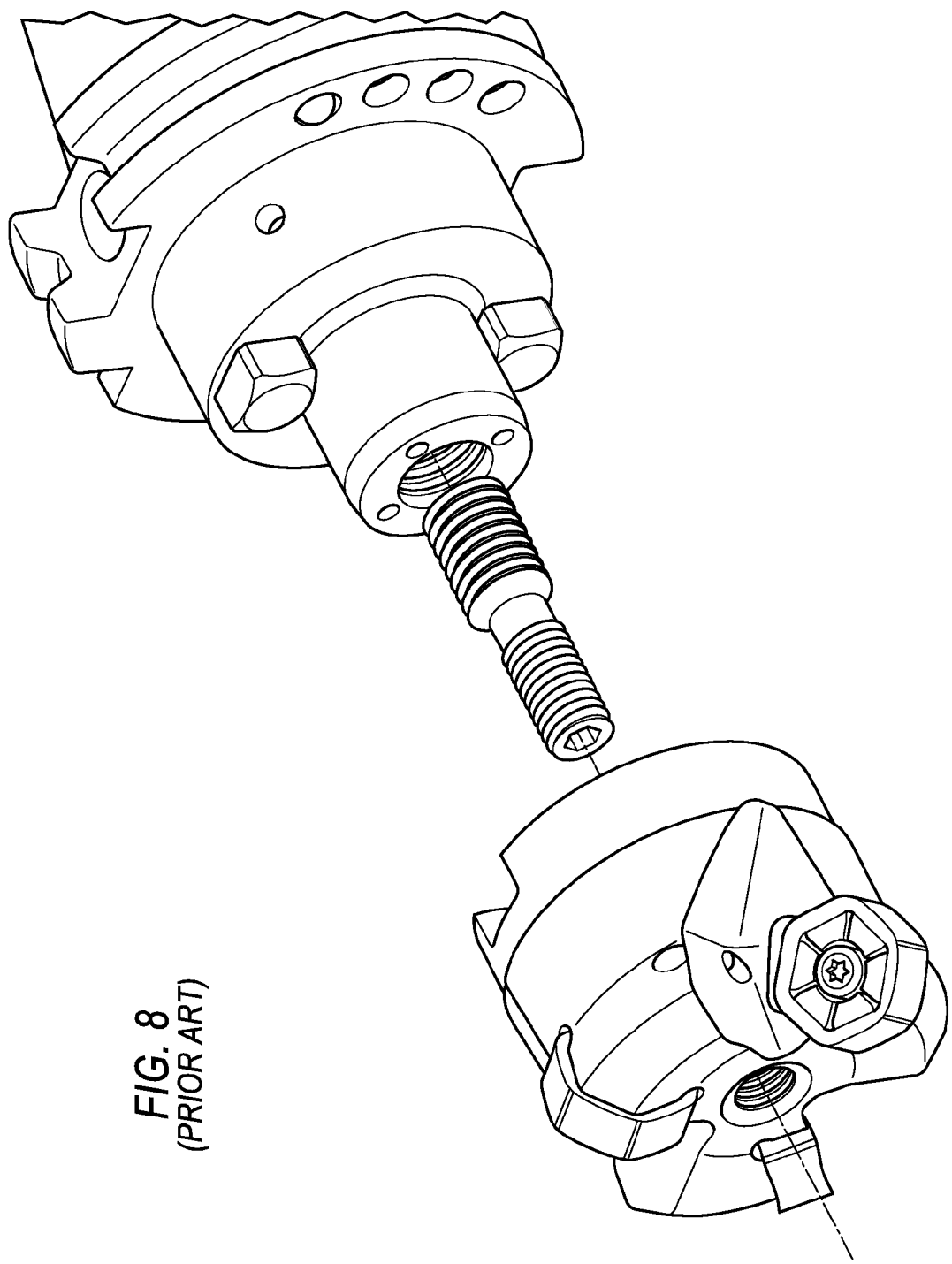
FIG. 8 is a partial perspective view of yet another conventional fastener for attaching a milling cutter to an adaptor.

Referring now to FIGS. 3-5, a method for installing the milling cutter body 12 to the adaptor 14 using the fastener 10 of the invention will now be described. First, the fastener 10 is threaded into the milling cutter body 12 such that the fastener 10 moves in the direction of the arrow, as shown in FIG. 3. It is understood that the milling cutter body 12 has threads 34 (FIG. 2) to allow the fastener 10 to be threaded into the milling cutter body 12. Then, the fastener 10 is threaded completely through the milling cutter body 12 until the head portion 16 contacts a seating surface 30 in a counter bore 32 of the milling cutter body 12, as shown in FIG. 4. As mentioned earlier, the undercut 26 allows the fastener 10 to freely rotate in the milling cutter body 12 once the fastener 10 is threaded completely through the milling cutter body 12. Then, the milling cutter body 12 can be placed on a pilot 36 of the adaptor 14 and threaded into the adaptor 14 to draw the milling cutter body 12 onto the adaptor 14, as shown in FIG. 5. At this point, the milling cutter body 12 is securely attached to the adaptor 14.

As described above, the fastener 10 of the invention provides a simple, user-friendly solution for attaching a shell mill style milling cutter body to a standard adaptor when conventional fasteners will not work due to cutter design constraints.

The patents and publications referred to herein are hereby incorporated by reference.

Having described presently preferred embodiments the invention may be otherwise embodied within the scope of the appended claims.

What is claimed is:

1. An assembly for attaching a milling cutter body to an adaptor, comprising:
a milling cutter body having threads;
an adaptor including a pilot adapted to received in a recess of the milling cutter body; and
a fastener, said fastener comprising:

a head portion having a diameter;

a body portion including threads having a thread root diameter; and an undercut disposed between the head and the body portion, the undercut having a diameter equal to or less than the thread root diameter, wherein the undercut allows the fastener to freely rotate once the fastener is threaded completely through the milling cutter body, thereby allowing the fastener to be threaded into the pilot of the adaptor to draw the milling cutter body onto the adaptor and securely attach the milling cutter body to the adaptor.

2. The assembly according to claim 1, wherein the diameter of the head portion is greater than the diameter of the undercut and the thread root diameter.

3. The assembly according to claim 1, wherein the fastener is threaded completely through the milling cutter body until the head portion contacts a seating surface of the milling cutter body.

4. The assembly according to claim 3, wherein the seating surface is positioned in a counter bore of the milling cutter body.

\* \* \* \* \*